US012578418B2

(12) United States Patent
Baek et al.

(10) Patent No.: US 12,578,418 B2
(45) Date of Patent: Mar. 17, 2026

(54) PREPROCESSING METHOD OF GENERATING TRAINING DATA OF DEEP LEARNING MODEL FOR ESTIMATING POSITION OF TARGET OBJECT IN ENVIRONMENT HAVING MANY OBSTACLES, LEARNING METHOD OF THE DEEP LEARNING MODEL, AND COMPUTING APPARATUS FOR ESTIMATING POSITION OF THE TARGET OBJECT

(71) Applicant: ELECTRONICS AND TELECOMMUNICATIONS RESEARCH INSTITUTE, Daejeon (KR)

(72) Inventors: Jaeuk Baek, Daejeon (KR); Sang Joon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 397 days.

(21) Appl. No.: 18/121,151

(22) Filed: Mar. 14, 2023

(65) Prior Publication Data

US 2024/0219508 A1 Jul. 4, 2024

(30) Foreign Application Priority Data

Jan. 2, 2023 (KR) ........................ 10-2023-0000120

(51) Int. Cl.
*G01S 5/02* (2010.01)

(52) U.S. Cl.
CPC ................................ *G01S 5/02524* (2020.05)

(58) Field of Classification Search
CPC ....................................... G01S 5/02524–02527
See application file for complete search history.

(56) References Cited

U.S. PATENT DOCUMENTS

| | | | | |
|---|---|---|---|---|
| 7,796,966 B2 * | 9/2010 | Bhattacharya | ........ | H04W 64/00 455/67.11 |
| 2007/0247366 A1 * | 10/2007 | Smith | .................... | H04W 4/029 342/464 |

(Continued)

FOREIGN PATENT DOCUMENTS

| | | |
|---|---|---|
| KR | 10-2009-0054933 A | 6/2009 |
| KR | 10-2018-0083525 A | 7/2018 |

(Continued)

*Primary Examiner* — Cassi J Galt
(74) *Attorney, Agent, or Firm* — LRK PATENT LAW FIRM

(57) ABSTRACT

A preprocessing method of a data preprocessing device is provided. The preprocessing method includes dividing a region, where the target object is located, into coarse grids and generating first sample data including a similarity value between a virtual sensor measurement value and a real sensor measurement value measured in each of the coarse grids, dividing each coarse grid into fine grids and generating second sample data including a similarity value between a virtual sensor measurement value and a real sensor measurement value measured in each of the fine grids, dividing each fine grid into finer grids and generating third sample data including a similarity value between a virtual sensor measurement value and a real sensor measurement value measured in each of the finer grids, and inputting the training data, including the first to third sample data, to the deep learning model.

12 Claims, 8 Drawing Sheets

(56)          References Cited

U.S. PATENT DOCUMENTS

| 2010/0106745 | A1* | 4/2010 | Cho | G01S 5/02528 |
| | | | | 707/802 |
| 2012/0032843 | A1 | 2/2012 | Lee et al. | |
| 2015/0017995 | A1* | 1/2015 | Wirola | H04W 4/029 |
| | | | | 455/446 |
| 2015/0117154 | A1 | 4/2015 | Kwak | |
| 2021/0029500 | A1* | 1/2021 | Ye | H04W 4/029 |
| 2022/0299593 | A1 | 9/2022 | Abir et al. | |
| 2024/0151806 | A1* | 5/2024 | Ivanov | G01S 5/02523 |

FOREIGN PATENT DOCUMENTS

| KR | 10-2019-0053470 A | 5/2019 |
| KR | 10-2020-0017612 A | 2/2020 |
| KR | 10-2317856 B1 | 10/2021 |
| KR | 10-2022-0071843 A | 5/2022 |

* cited by examiner

FIG. 2

| TIME | SENOR #1 MEASUREMENT VALUE | ... | SENOR #K MEASUREMENT VALUE | TARGET OBJECT POSITION (COORDINATE VALUE) | 2D/3D SAMPLE |
|------|---------------------------|-----|----------------------------|-------------------------------------------|--------------|
| | | | | | |
| | | | | | |
| | | | | | |
| | | | | | |

21    22    23    24

|  | TIME t+1 | TIME t+2 | . . . | TIME t+M−1 | TIME t+M |
|---|---|---|---|---|---|
| coarse grid #1 |  |  |  |  |  |
| coarse grid #2 |  |  |  |  |  |
| coarse grid #3 |  |  |  |  |  |
| : |  |  |  |  |  |
| coarse grid #N |  |  |  |  |  |

FIG. 5

| @ SENSOR K | TIME t+1 | TIME t+2 | . . . | TIME t+M-1 | TIME t+M |
|---|---|---|---|---|---|

| @ SENSOR K-1 | TIME t+1 | TIME t+2 | . . . | TIME t+M-1 | TIME t+M |
|---|---|---|---|---|---|
| coarse grid #1 | | | | | |

| @ SENSOR 2 | TIME t+1 | TIME t+2 | . . . | TIME t+M-1 | TIME t+M |
|---|---|---|---|---|---|
| coarse grid #1 | | | | | |

| @ SENSOR 1 | TIME t+1 | TIME t+2 | . . . | TIME t+M-1 | TIME t+M |
|---|---|---|---|---|---|
| coarse grid #1 | | | | | |
| coarse grid #2 | | | | | |
| coarse grid #3 | | | | | |
| : | | | | | |
| coarse grid #N | | | | | |

FIG. 7

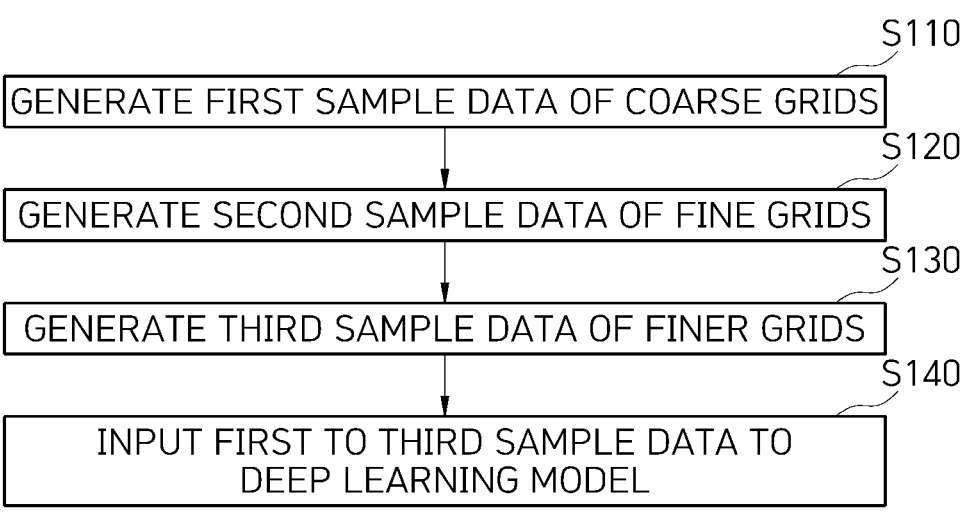

S110
GENERATE FIRST SAMPLE DATA OF COARSE GRIDS

S120
GENERATE SECOND SAMPLE DATA OF FINE GRIDS

S130
GENERATE THIRD SAMPLE DATA OF FINER GRIDS

S140
INPUT FIRST TO THIRD SAMPLE DATA TO
DEEP LEARNING MODEL

FIG. 8

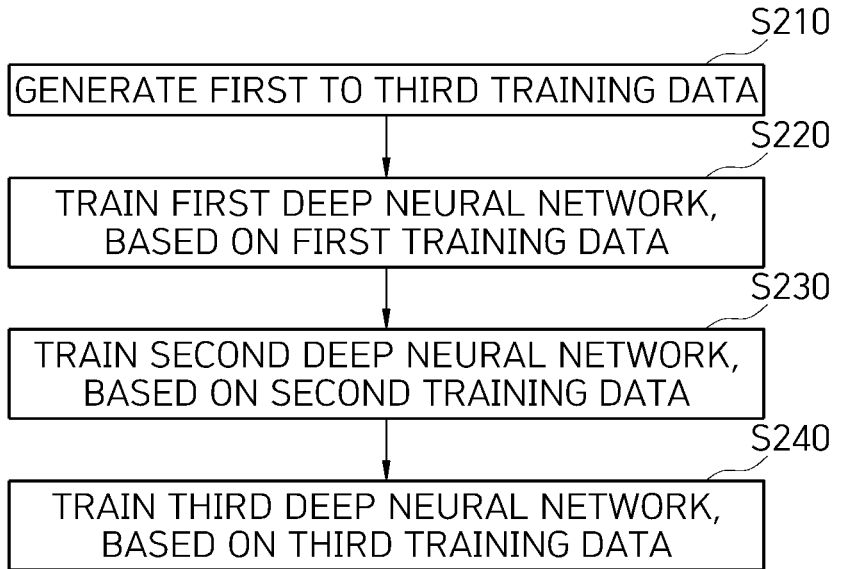

S210
GENERATE FIRST TO THIRD TRAINING DATA

S220
TRAIN FIRST DEEP NEURAL NETWORK,
BASED ON FIRST TRAINING DATA

S230
TRAIN SECOND DEEP NEURAL NETWORK,
BASED ON SECOND TRAINING DATA

S240
TRAIN THIRD DEEP NEURAL NETWORK,
BASED ON THIRD TRAINING DATA

PREPROCESSING METHOD OF GENERATING TRAINING DATA OF DEEP LEARNING MODEL FOR ESTIMATING POSITION OF TARGET OBJECT IN ENVIRONMENT HAVING MANY OBSTACLES, LEARNING METHOD OF THE DEEP LEARNING MODEL, AND COMPUTING APPARATUS FOR ESTIMATING POSITION OF THE TARGET OBJECT

CROSS-REFERENCE TO RELATED APPLICATION

This application claims the benefit of the Korean Patent Application No. 10-2023-0000120 filed on Jan. 2, 2023, which is hereby incorporated by reference as if fully set forth herein.

BACKGROUND

1. Field of the Invention

The present invention relates to positioning technology for a target object, and more particularly, to high-reliability positioning technology for a target object in an environment where there are many obstacles.

2. Description of Related Art

Technology for estimating a position of a target object on the basis of a wireless signal received from a sensor may be categorized into signal processing-based positioning technology and machine learning (deep learning model)-based positioning technology. When a line of sight (LoS) between a sensor and a target object is ensured, the signal processing-based positioning technology may provide an accurate positioning result. However, due to an error which occurs from a non-LoS path in a wireless signal in an environment having many obstacles, a theoretic approach method based on signal processing has a limitation in estimating an accurate position of a target object.

The machine learning-based positioning technology is a method which collects massive wireless signal data in an assigned environment and learns an environment factor causing an error of the wireless signal data, thereby enhancing the accuracy of positioning.

The machine learning-based positioning technology is better in positioning performance than the signal processing-based positioning technology in an environment where there are many obstacles, but an important issue thereof is a method of preprocessing a wireless signal.

In a case which accurately preprocesses wireless signal data, because the accuracy of positioning is enhanced but calculation complexity is high, there is a high possibility that it is unable to secure real-time efficiency, and in a case which minimizes preprocessing for real-time positioning, a problem occurs where the accuracy of positioning is reduced.

SUMMARY

An aspect of the present invention is directed to providing a method and an apparatus, which may solve a problem of trade-off between real-time processing and performance occurring in preprocessing wireless signal data and may provide a position of a target object and a range where the target object is located, thereby providing a high-reliability positioning result of the target object even in an environment where there are many obstacles.

To achieve these and other advantages and in accordance with the purpose of the invention, as embodied and broadly described herein, there is provided a preprocessing method of a data preprocessing device for generating training data of a deep learning model estimating a position of a target object, the preprocessing method including: dividing a region, where the target object is located, into coarse grids and generating first sample data including a similarity value between a virtual sensor measurement value and a real sensor measurement value measured in each of the coarse grids; dividing each coarse grid into fine grids and generating second sample data including a similarity value between a virtual sensor measurement value and a real sensor measurement value measured in each of the fine grids; dividing each fine grid into finer grids and generating third sample data including a similarity value between a virtual sensor measurement value and a real sensor measurement value measured in each of the finer grids; and inputting the training data, including the first to third sample data, to the deep learning model.

In another aspect of the present invention, there is provided a learning method of a deep learning model for estimating a position of a target object, the learning method including: dividing, by using a data preprocessing device, a region including a target object into coarse grids, fine grids, and finer grids and generating first training data including a difference value between a virtual sensor measurement value and a real sensor measurement value measured in each of the coarse grids, second training data including a difference value between a virtual sensor measurement value and a real sensor measurement value measured in each of the fine grids, and third training data including a difference value between a virtual sensor measurement value and a real sensor measurement value measured in each of the finer grids; training, by using a learning device, a first deep neural network estimating a coarse range where the target object is located, based on the first training data; training, by using the learning device, the second deep neural network estimating a fine range where the target object is located, based on the second training data; and training, by using the learning device, the third deep neural network estimating a position of the target object, based on the third training data.

In another aspect of the present invention, there is provided a computing apparatus including: a communication device configured to collect a real sensor measurement value; a data preprocessing device configured to divide a region, where a target object is located, into coarse grids, fine grids, and finer grids and generate first preprocessing data including a similarity value between a virtual sensor measurement value and a real sensor measurement value measured in each of the coarse grids, second preprocessing data including a similarity value between a virtual sensor measurement value and a real sensor measurement value measured in each of the fine grids, and third preprocessing data including a similarity value between a virtual sensor measurement value and a real sensor measurement value measured in each of the finer grids; and an inference device including a first deep neural network configured to estimate position information about a coarse grid, where the target object is located, by using the first preprocessing data as input data, a second deep neural network configured to estimate position information about a fine grid, where the target object is located, by using the second preprocessing data as input data, and a third deep neural network configured to estimate a position of the target object by using the third preprocessing data as input data.

It is to be understood that both the foregoing general description and the following detailed description of the present invention are exemplary and explanatory and are intended to provide further explanation of the invention as claimed.

BRIEF DESCRIPTION OF THE DRAWINGS

FIG. 2 is a diagram for describing an example of a data structure provided by a data collection device according to various embodiments of the present invention.

FIG. 5 is a diagram for describing a three-dimensional (3D) matrix extending from a two-dimensional (2D) matrix, according to various embodiments of the present invention.

FIG. 7 is a flowchart illustrating an operating method (a preprocessing method) performed by a data preprocessing device according to various embodiments of the present invention.

FIGS. 8 and 9 are diagrams for describing a learning method of a deep learning model for estimating a position of a target object, according to various embodiments of the present invention.

DETAILED DESCRIPTION OF THE INVENTION

In the following description, the technical terms are used only for explaining a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
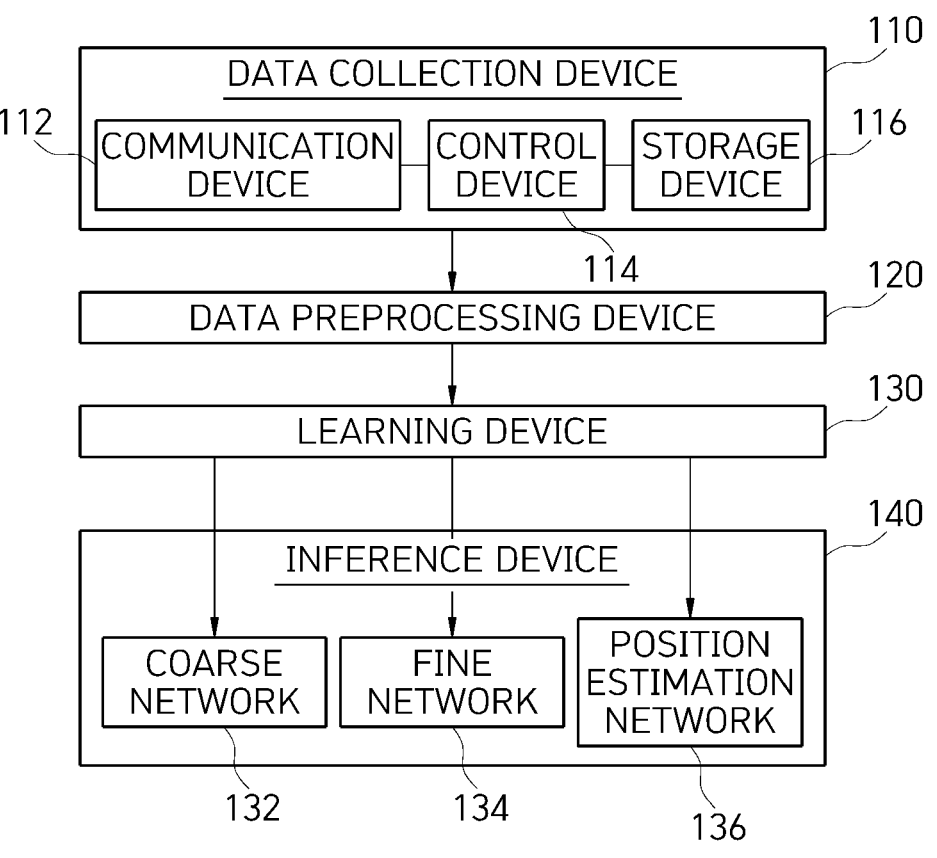
FIG. 1 is a block diagram of a deep learning-based obstacle positioning apparatus according to various embodiments of the present invention.

FIG. 1 is a block diagram of a deep learning-based obstacle positioning apparatus 100 according to various embodiments of the present invention.

Referring to FIG. 1, the deep learning-based obstacle positioning apparatus 100 according to various embodiments of the present invention may include a data collection device 110, a data preprocessing device 120, a learning device 130, and an inference device 140.

The devices 110 to 140 may be differentiated from one another by processing units so as to help understand the present invention, but are not limited thereto. Therefore, based on a design, some devices may be integrated into one device, and one device may be divided into a plurality of devices. For example, the devices 110 to 140 may be integrated into one computing device, or the devices 120 to 140 other than the data collection device 110 may be integrated into one computing device.

The data collection device 110 may collect various kinds of wireless signal data so as to learn a deep learning model.

The data preprocessing device 120 may divide an observation region, where a target object is located, into grids having a certain size.

Moreover, the data preprocessing device 120 may generate a 2D sample having a data structure used in learning of a deep learning model, based on triplet information configured to include sensor position information (a value or data), target object position information (a value or data), and wireless signal information (a value or data). In this case, the data preprocessing device 120 may generate three kinds of grids so as to solve a trade-off relationship between 'performance' and 'real-time preprocessing'.

The learning device 130 may learn and generate three deep learning models 132, 134, and 136 for estimating a position of the target object at three stages. The three deep learning models 132, 134, and 136 may be configured as independent deep neural networks (hereinafter referred to as a 'network').

A first-stage deep learning model 132 may be configured as a network for estimating a coarse range (hereinafter referred to as a 'coarse range estimation network'). A second-stage deep learning model 134 may be configured as a network for estimating a fine range (hereinafter referred to as a 'fine range estimation network'). Also, a third-stage deep learning model 136 may be configured as a network for estimating a position (hereinafter referred to as a 'position estimation network').

Each deep learning model may be implemented as a classification model based on a multilayer perceptron (MLP) or a convolutional neural network (CNN). Also, each deep learning model may be implemented as a feature extraction model based on an auto-encoder (AE). Also, each deep learning model may be implemented as the other machine learning model based on a principal component analysis (PCA) or a support vector machine (SVC).

The inference device 140 may sequentially load (input) a sample, obtained by preprocessing newly received wireless signal information by using the data preprocessing device 120, to the three deep learning models 132, 134, and 136 generated by the learning device 130 to estimate the position of the target object.

To analyze a time-series characteristic of the wireless signal information received from the target object, the data collection device 110 may store the received wireless signal information by cycle times. To this end, the data collection device 110 may include a communication device 112, a control device 114, and a storage device 116.

A communication device may be a device which receives wireless signal information from a target object(s). Here, the wireless signal information may be signal information generated by a wireless signal generating device (for example, a sensor and a tag having a communication function) installed in the target object(s), or may be signal information reflected to a surface of the target object. A control device may be a device which processes the wireless signal information received from the target object, and to this end, may be configured to include a processor and a memory. Here, the processor may be implemented as at least one central processing unit (CPU), at least one microcontroller unit (MCU), or at least one system on chip (SoC). The storage device 116 may be implemented as a non-volatile storage medium which stores information obtained by processing wireless signal information received through the communication device 112 and/or wireless signal information received by the control device 114 from the target object.

When wireless signal information is not collected at a specific cycle time, the data collection device 110 or the control device 114 may analyze previously collected wireless signal information on the basis of a regression technique or an interpolation technique, restore the wireless signal information which is not collected, and store restored wireless signal information in the storage device 116.

Available wireless signal information may be changed based on a position at which a target object is located. For example, when the target object is located at an outdoor position, the available wireless signal information may include global positioning system (GPS) signal information and real time kinematic positioning (RTK) signal information. When the target object is located at an indoor position, the available wireless signal information may include ultrawideband (UWB) signal information, frequency modulated continuous wave (FMCW) radar signal information, and multi input multi output (MIMO) signal information.

FIG. 2 is a diagram for describing an example of a data structure provided by the data collection device illustrated in FIG. 1.

Referring to FIG. 2, a data structure of data provided from the data collection device may include four fields (for example, first to fourth fields) 21 to 24.

A time at which each of sensors measures a sensor measurement value may be recorded in the first field 21. Sensor measurement values measured by sensors installed in target objects may be recorded in the second field. A coordinate value representing a target object position may be recorded in the third field 23. 2D sample data (a 2D matrix) or 3D sample data (a 3D matrix) described below may be recorded in the fourth field 24.

The sensor measurement values recorded in the second field 22 may be used as input values of the deep learning models 132, 134, and 136.

The target object position (a coordinate value) recorded in the third field 23 may be used as ground truth data for learning the deep learning models 132, 134, and 136. Here, the ground truth data may denote data of a real environment, which is used to train or test the deep learning models 132, 134, and 136.

To obtain the ground truth data, a position of a target object should be accurately recorded in an observation region, and when the target object moves, a sensor measurement value should be stored. To this end, an observation region where a target object is located should be divided into N (where N is a natural number of 2 or more) number of grids, and a sensor measurement value should be collected under a condition where the target object is moving via all grids. In this case, a movement path of the target object may be set randomly, and the target object may pass through a grid through which the target object has passed once, without being limited.

A measurement frequency of a sensor may be higher than a movement speed of a target object, and thus, sensor measurement values may be sufficiently obtained in each grid.

When it is assumed that an observation region where a target object is located is divided into three kinds of grids and the target object is located at a grid center position, the data preprocessing device 120 may analyze a similarity (or a difference value) between a virtual sensor measurement value and a real sensor measurement value representing a distance up to a sensor from a real position of the target object to generate a 2D sample having a data structure, which is used to train deep learning models.

When a grid center position is (Xcenter, Ycenter), a target object position is (Xtarget, Ytarget), a sensor position is (Xsensor, Ysensor), and a real sensor measurement value is R, a mathematical model for analyzing the similarity between the virtual sensor measurement value and the real sensor measurement value based on the kind of a wireless signal and the kind of signal processing may be represented by the following Equations 1, 2, and 3.

The following Equation 1 may represent a mathematical model for analyzing the similarity (or the difference value) between the virtual sensor measurement value and the real sensor measurement value when the kind of the wireless signal is a GPS signal and/or a received signal strength (RSS) signal and the kind of signal processing is a time of arrival (TOA).

$$f(x, y) = \sqrt{(x - X_{sensor})^2 + (y - Y_{sensor})^2} \qquad \text{[Equation 1]}$$

REAL SENSOR MEASUREMENT VALUE $(R) =$ $$f(X_{target}, Y_{target})$$

VIRTUAL SENSOR MEASUREMENT VALUE $=$ $$f(X_{center}, Y_{center})$$

SIMILARITY $= R - f(X_{center}, Y_{center})$

The following Equation 2 may represent a mathematical model for analyzing the similarity (or the difference value) between the virtual sensor measurement value and the real sensor measurement value when the kind of the wireless signal is a UWS signal and the kind of signal processing is a time difference of arrival (TDOA).

$$f(x, y) = \left| \sqrt{(x - X_{sensor1})^2 + (y - Y_{sensor1})^2} - \right. \qquad \text{[Equation 2]}$$
$$\left. \sqrt{(x - X_{sensor2})^2 + (y - Y_{sensor2})^2} \right|$$

REAL SENSOR MEASUREMENT VALUE $(R) =$ $$f(X_{target}, Y_{target})$$

VIRTUAL SENSOR MEASUREMENT VALUE $=$ $$f(X_{center}, Y_{center})$$

SIMILARITY $= R - f(X_{center}, Y_{center})$

The following Equation 3 may represent a mathematical model for analyzing the similarity (or the difference value) between the virtual sensor measurement value and the real sensor measurement value when the kind of the wireless signal is an FMCW signal and the kind of signal processing is a TDOA.

$$f(x, y) = \left| \sqrt{(x - X_{sensor1})^2 + (y - Y_{sensor1})^2} + \right.$$
$$\left. \sqrt{(x - X_{sensor2})^2 + (y - Y_{sensor2})^2} \right|$$

[Equation 3]

REAL SENSOR MEASUREMENT VALUE (R) =

$$f(X_{target}, Y_{target})$$

VIRTUAL SENSOR MEASUREMENT VALUE =

$$f(X_{center}, Y_{center})$$

SIMILARITY = $R - f(X_{center}, Y_{center})$

Figures 3, 4:
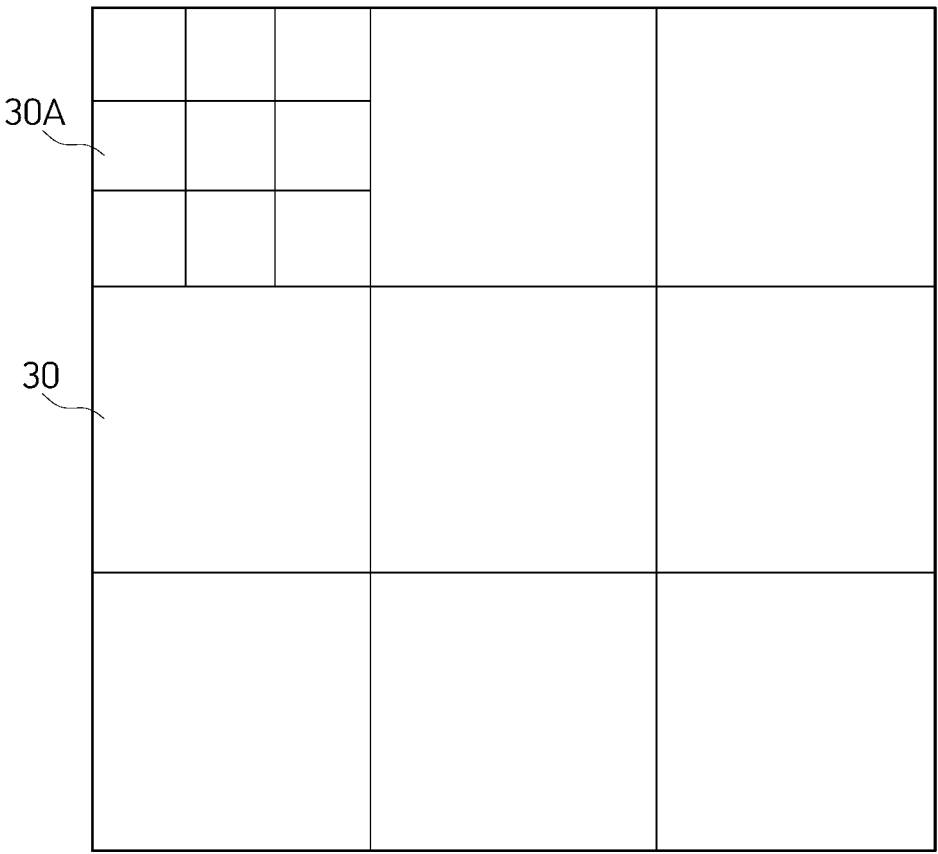
FIG. 3 is a diagram for describing an example where a target object observation region is divided into two kinds of grids, according to various embodiments of the present invention.
FIG. 4 is a diagram for describing a result obtained by processing, in a matrix form, a similarity between a real sensor measurement value and a virtual sensor measurement value of a coarse grid in a data preprocessing device according to various embodiments of the present invention.

FIG. 3 is a diagram for describing an example where an observation region of a target object is divided into two kinds of grids, according to various embodiments of the present invention.

Referring to FIG. 3, grids 30 of Type 1 may be grids where an observation region where a target object is located is N (where N is a natural number of 2 or more) number of grids, and grids 30A of Type 2 may be grids where one coarse grid 30 is again divided into N number of fine grids.

For example, when N is 9, an observation region where a target object is located may be divided into nine coarse grids, and one coarse grid may be divided into nine fine grids again.

The coarse grids may each be used as an input value of a coarse range estimation network (132 of FIG. 1) generated by the learning device 130, and the fine grids may each be used as an input value of a fine range estimation network (134 of FIG. 1).

FIG. 4 is a diagram for describing a result obtained by processing, in a matrix form, a similarity between a real sensor measurement value and a virtual sensor measurement value of a coarse grid in a data preprocessing device according to various embodiments of the present invention.

Referring to FIG. 4, when an observation region where a target object is located is divided into coarse grids, the data preprocessing device 120 may provide a similarity between a virtual sensor measurement value and a real sensor measurement value in a data structure having a matrix form.

For example, the data preprocessing device 120 may provide, as training data, sample data having a matrix form which is configured with rows including indexes representing coarse grids and columns including indexes representing cycle times (t+1, t+2, . . . , and t+M). In this case, the sample data may be constructed in a 2D data structure where a similarity between a virtual sensor measurement value and a real sensor measurement value is provided in an N×M matrix form.

Similarly, when an observation region where a target object is located is divided into fine grids, the data preprocessing device 120 may provide sample data having a data structure where a similarity between a virtual sensor measurement value and a real sensor measurement value is provided in the N×M matrix form.

The N×M matrix form may include time-series information about a movement of the target object.

FIG. 5 is a diagram for describing a 3D matrix extending from a 2D matrix, according to various embodiments of the present invention.

Referring to FIG. 5, the 2D matrix illustrated in FIG. 4 may be sample data representing time-series information about one target object obtained based on one sensor position, and the 3D matrix may be sample data representing time-series information about one target object obtained based on a plurality of sensor positions. For example, when the number of sensor is a K number, the 3D matrix may include K number of matrixes having an N×M size.

The 3D matrix may be identically applied to a case where an observation region where a target object is located is divided into fine grids, and when the number of sensors is a K number, a 3D matrix of fine grids may also include K number of matrixes having an N×M size.

A 3D matrix of coarse grids may be used as training data of the coarse range estimation network 132, and a 3D matrix of fine grids may be used as training data of the fine range estimation network 132.

Figure 6:
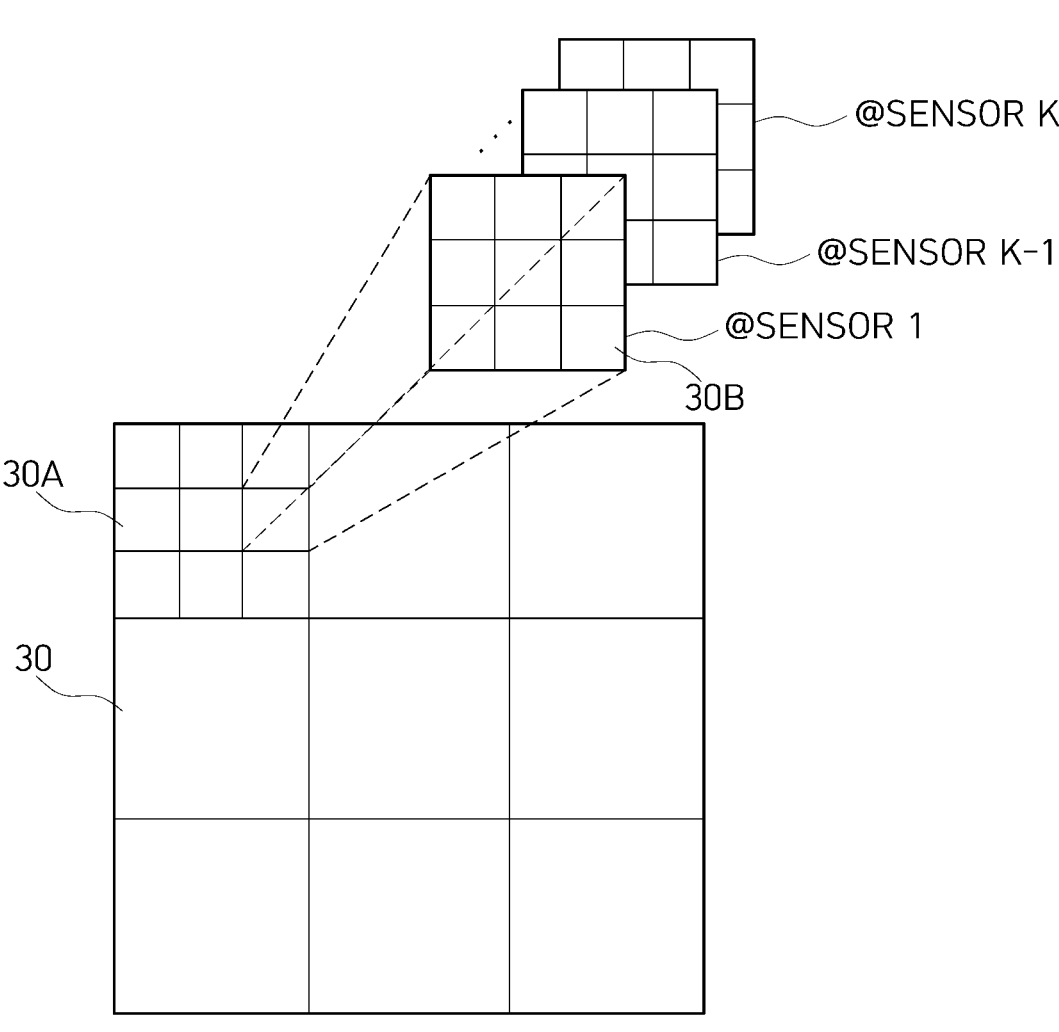
FIG. 6 is a diagram for describing an example where a fine grid is divided into finer grids, according to various embodiments of the present invention.

FIG. 6 is a diagram for describing an example where a fine grid is divided into finer grids, according to various embodiments of the present invention.

Referring to FIG. 6, in a finer grid 30B according to another embodiment of the present invention, the fine grid 30A may be divided into N number of finer grids 30B again. In this manner, the data preprocessing device 120 may generate a 3D matrix including K number of matrixes having an N×M size, based on the finer grid 30B.

A 3D matrix of the finer grids 30B may be used as training data of the network 136 which estimates a position of a target object.

The following Table 1 may show input values and output values of the networks 132, 134, and 136 illustrated in FIG. 1.

TABLE 1

| Model | Input Value | Output Value |
|---|---|---|
| Coarse range estimation network (132 of FIG. 1) | 3D matrix of coarse grids | Index representing coarse grid (hereinafter referred to as coarse grid index), where it is estimated that target object is located, of coarse grids |
| Fine range estimation network (134 of FIG. 1) | Coarse grid index 3D matrix of fine grids | Index representing fine grid (hereinafter referred to as fine grid index), where it is estimated that target object is located, of fine grids |
| Position range estimation network (136 of FIG. 1) | Coarse grid index Fine grid index 3D matrix of finer grids | Estimated target object position |

A coarse grid index which is an output value of the coarse range estimation network 132 and a fine grid index which is an output value of the fine range estimation network 134 may each be expressed as a one-hot vector.

The coarse grid index which is the output value of the coarse range estimation network 132 may be used as an input value for training the fine range estimation network 134.

The coarse grid index which is the output value of the coarse range estimation network 132 and the fine grid index which is the output value of the fine range estimation network 134 may each be used as an input value of the position estimation network 136.

An output value of each network may be used as ground truth data in performing learning, and in this case, as illustrated in FIG. 2, sensor data may be collected for each target object position, whereby training data may be constructed based on a ground truth form.

FIG. 7 is a flowchart illustrating an operating method performed by a data preprocessing device according to various embodiments of the present invention.

Referring to FIG. 7, a main element for performing each step described below may be assumed as a processor included in the data preprocessing device 120.

First, in step S110, a step of dividing a region, where a target object is located, into coarse grids and generating first sample data including a similarity value between a virtual sensor measurement value and a real sensor measurement value measured in each of the coarse grids may be performed.

Subsequently, in step S120, a step of dividing each coarse grid into fine grids and generating second sample data including a similarity value between a virtual sensor measurement value and a real sensor measurement value measured in each of the fine grids may be performed.

Subsequently, in step S130, a step of dividing each fine grid into finer grids and generating third sample data including a similarity value between a virtual sensor measurement value and a real sensor measurement value measured in each of the finer grids may be performed.

Subsequently, in step S140, a step of inputting the training data, including the first to third sample data, to the deep learning model may be performed.

In an embodiment, the deep learning model may include a first deep neural network 132 which estimates a coarse range where the target object is located, a second deep neural network 134 which estimates a fine range where the target object is located, and a third deep neural network 136 which estimates a position of the target object. In this case, the first sample data may be used as the training data of the first deep neural network 132, the second sample data may be used as the training data of the second deep neural network 134, and the third sample data may be used as the training data of the third deep neural network 136.

In an embodiment, each of the first to third sample data may be constructed in a data structure having a matrix form which is configured with rows including grid indexes and columns including cycle time indexes.

In an embodiment, when it is assumed that the target object is located at a center position of the coarse grid, the fine grid, or the finer grid, the virtual sensor measurement value may be a measurement value representing a distance between the target object and the sensor, and the real sensor measurement value may be a measurement value representing a distance between the target object and the sensor.

In an embodiment, the coarse grids may denote that the region is divided into A number of coarse grids, the fine grids may denote that each of the coarse grids is divided into B number of fine grids, and the finer grids may denote that each of the fine grids is divided into C number of finer grids. Here, A, B, and C may be the same number or different numbers.

Figure 9:
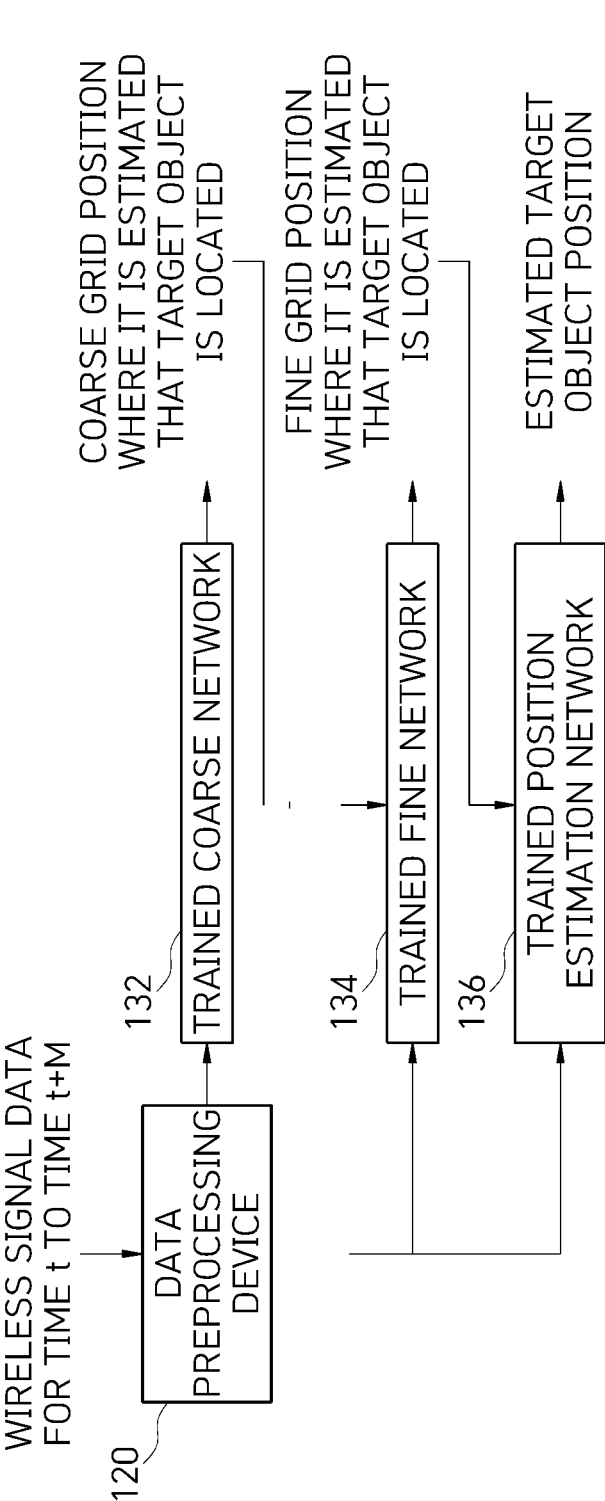

FIGS. 8 and 9 are diagrams for describing a learning method of a deep learning model for estimating a position of a target object, according to various embodiments of the present invention.

Referring to FIGS. 8 and 9, first, in step S210, a processor of the data preprocessing device 120 may perform a step of dividing a region, where a target object is located, into coarse grids, fine grids, and finer grids and generating first training data including a difference value between a virtual sensor measurement value and a real sensor measurement value measured in each of the coarse grids, second training data including a difference value between a virtual sensor measurement value and a real sensor measurement value measured in each of the fine grids, and third training data including a difference value between a virtual sensor measurement value and a real sensor measurement value measured in each of the finer grids.

Subsequently, in step S220, a processor of the learning device 130 may perform a step of training the first deep neural network estimating a coarse range where the target object is located, based on the first training data.

Subsequently, in step S230, the processor of the learning device 130 may perform a step of training the second deep neural network estimating a fine range where the target object is located, based on the second training data.

Subsequently, in step S240, the processor of the learning device 130 may perform a step of training the third deep neural network estimating a position of the target object, based on the third training data.

In an embodiment, the step of training the second deep neural network may be a step of training the second deep neural network, based on the second training data and output data of the trained first deep neural network. In this case, the output data of the trained first deep neural network may be an index representing a coarse grid, where it is estimated that the target object is located, of the coarse grids.

In an embodiment, the step of training the third deep neural network may be a step of training the third deep neural network, based on the third training data, the output data of the trained first deep neural network, and the output data of the trained second deep neural network. In this case, the output data of the trained second deep neural network may be an index representing a fine grid, where it is estimated that the target object is located, of the fine grids.

Figure 10:
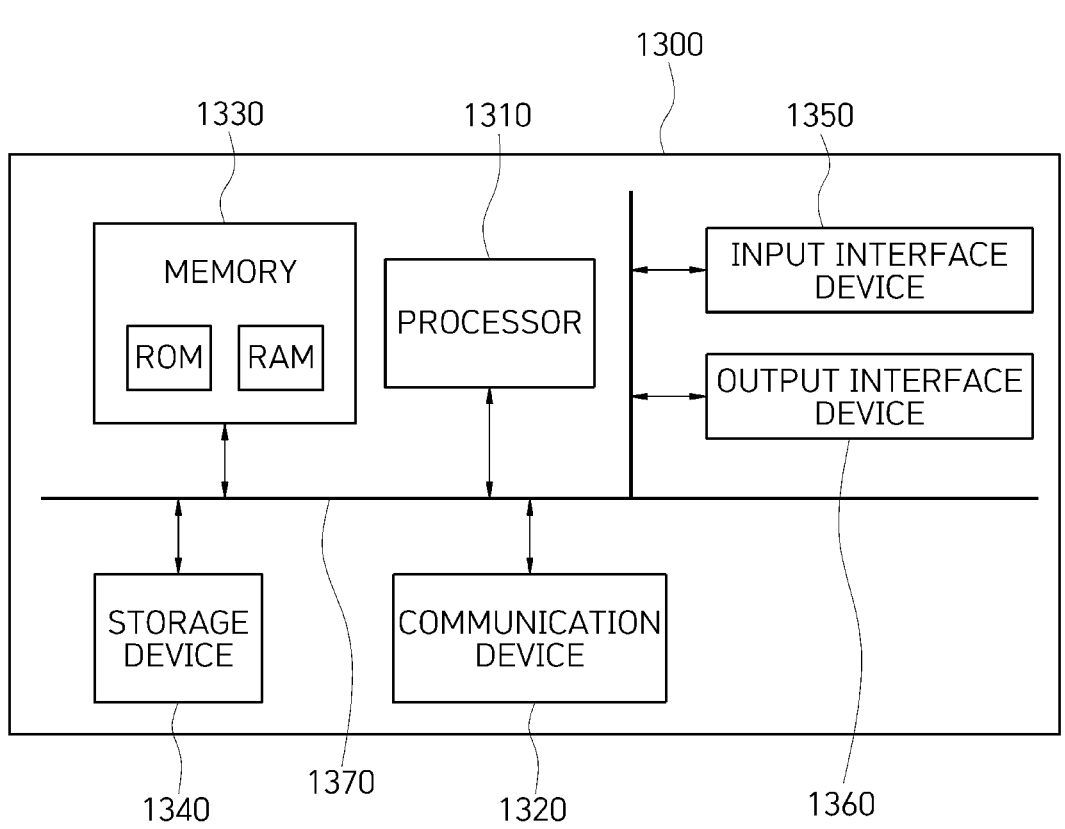
FIG. 10 is a block diagram of a computing apparatus for implementing methods according to various embodiments of the present invention.

FIG. 10 is a block diagram of a computing apparatus 1300 for implementing methods according to various embodiments of the present invention.

Referring to FIG. 10, the computing apparatus 1300 may be an apparatus which performs each step illustrated in FIGS. 7 and 8. Also, the computing apparatus 1300 may be an apparatus included in each of the devices 110 to 140 illustrated in FIG. 1. Also, in a case where the devices 110 to 140 illustrated in FIG. 1 are integrated into one apparatus, the integrated apparatus may be the computing apparatus 1300.

The computing apparatus 1300 may include at least one of a processor 1310, a memory 1330, an input interface device 1350, an output interface device 1360, and a storage device 1340, which communicate with one another through a bus 1370. The computing apparatus 1300 may include a communication device 1320 connected to a network.

The communication device 1320 may include communication parts, including a receiver, configured to receive various wireless signals associated with 3G, LTE, 4G, 5G, WiFi, and Bluetooth, in addition to a GPS signal, an RTK signal, an RSS signal, a UWB signal, an FMCW radar signal, and an MIMO radar signal.

In an embodiment, the communication device 1320 may collect wireless signal data (for example, a real sensor measurement value) for a time t to a time t+M.

The processor 1310 may be a CPU, a graphics processing unit (GPU), an MCU, a field programmable gate array (FPGA) chip, an SoC, or a semiconductor device which executes an instruction stored in the memory 1330 or the storage device 1340.

Each of the memory 1330 and the storage device 1340 may include various types of volatile or non-volatile storage mediums. For example, the memory 1330 may include read only memory (ROM) and random access memory (RAM). In an embodiment of the present invention, the memory 1330 may be provided in or outside the processor, and the memory 1330 may be connected with the processor through various means known to those skilled in the art.

The memory 1330 may be various types of volatile or non-volatile storage mediums, and for example, the memory 1330 may include ROM or RAM.

The storage device 1340 may store an artificial intelligence (AI) model and various instructions and program codes for executing and controlling the AI model.

In an embodiment, the computing apparatus 1300 included in the data preprocessing device 120 may perform a process of dividing a region, where a target object is located, into coarse grids, fine grids, and finer grids, and then, generating first preprocessing data including a similarity value between a virtual sensor measurement value and a real sensor measurement value measured in each of the coarse grids, second preprocessing data including a similarity value between a virtual sensor measurement value and a real sensor measurement value measured in each of the fine grids, and third preprocessing data including a difference value between a virtual sensor measurement value and a real sensor measurement value measured in each of the finer grids.

In an embodiment, the computing apparatus 1300 included in the learning device 130 may train a first deep neural network 132 which estimates a coarse range where the target object is located, based on the first training data, a second deep neural network 134 which estimates a fine range where the target object is located, based on the second training data, and a third deep neural network 136 which estimates a position of the target object, based on the third training data.

In an embodiment, the computing apparatus 1300 included in the inference device 130 may include the first deep neural network 132 which estimates position information about a coarse grid where the target object is located, by using the first preprocessing data as input data, the second deep neural network 134 which estimates position information about a fine grid where the target object is located, by using the second preprocessing data as input data, and the third deep neural network 136 which estimates a position of the target object, by using the third preprocessing data as input data, or may execute and control the first to third deep neural networks 132, 134, and 136.

In an embodiment, the second deep neural network may estimate a position of a fine grid where the target object is located, by using the position information about the coarse grid estimated by the first deep neural network and the second preprocessing data as the input data.

In an embodiment, the third deep neural network may estimate a position of the target object by using the position information about the coarse grid estimated by the first deep neural network, the position information about the fine grid estimated by the second deep neural network, and the third preprocessing data as the input data.

According to the embodiment of the present invention, wireless signal data (a sensor measurement value) collected in time series may be analyzed to provide a position of a target object and a range where the target object is located, thereby providing an optimized positioning result.

Moreover, the present invention may solve a problem of trade-off between real-time processing and performance occurring in preprocessing wireless signal data, and moreover, the present invention is not limited to wireless signal data obtained from a single sensor and may be applied to a hybrid positioning system which uses wireless signal data obtained from different kinds of sensors.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A computer-implemented preprocessing method performed by a data preprocessing device, comprising at least one processor and memory, for generating training data of a deep learning model estimating a position of a target object, the method comprising:

receiving, from a plurality of real sensors deployed in a real environment, real sensor measurement values representing distances between the sensors and the target object;

dividing a region, where the target object is located, into coarse grids and generating, by the data preprocessing device, first sample data including a similarity value between a virtual sensor measurement value and real sensor measurement values measured in each of the coarse grids;

dividing each coarse grid into fine grids and generating, by the data processing device, second sample data including a similarity value between a virtual sensor measurement value and real sensor measurement values measured in each of the fine grids;

dividing each fine grid into finer grids and generating, by the data preprocessing device, third sample data including a similarity value between a virtual sensor measurement value and real sensor measurement values measured in each of the finer grids;

structuring the similarity values into a matrix structure indexed by grid and cycle time; and inputting the structured training data into a deep neural network, wherein the deep neural network comprises a first deep neural network for estimating a coarse range of where the target object is located, a second deep neural network for estimating a fine range of where the target object is located, and a third deep neural network for estimating the position of the target object, each trained using the corresponding range of sample data.

2. The preprocessing method of claim 1, wherein, when it is assumed that the target object is located at a center position of the coarse grid, the fine grid, or the finer grid, the virtual sensor measurement value is a measurement value representing a distance between the target object and the sensor, and the real sensor measurement value is a measurement value representing a distance between the target object and the sensor.

3. The preprocessing method of claim 1, wherein the coarse grids denote that the region is divided into A number of coarse grids, the fine grids denote that each of the coarse grids is divided into B number of fine grids, the finer grids denote that each of the fine grids is divided into C number of finer grids, and A, B, and C are the same number or different numbers.

4. A computer-implemented learning method of a deep learning model for estimating a position of a target object performed by a data preprocesing device, comprising at least one processor and memory, the learning method comprising:

receiving, from a plurality of real sensors deployed in a real environment, real sensor meaurement values representing distances between the sensors and the target object;

dividing, by using a data preprocessing device, a region including a target object into coarse grids, fine grids, and finer grids and generating first training data preprocessing device, first training data including a difference value between a virtual sensor measurement value and a real sensor measurement value measured in each of the coarse grids, second training data including a difference value between a virtual sensor measurement value and a real sensor measurement value measured in each of the fine grids, and third training data including a difference value between a virtual sensor measurement value and a real sensor measurement value measured in each of the finer grids;

structuring the difference values in a matrix structure indexed by grid and cycle time; and inputting the matrix structure data into a deep neural network, wherein the deep neural network comprises a first deep neural network for estimating a coarse range of where the target object is located, a second deep neural network for estimating a fine range of where the target object is located, and a third deep neural network for estimating a position of the target object;

training the first deep neural network estimating a coarse range where the target object is located, based on the first training data;

training the second deep neural network estimating a fine range where the target object is located, based on the second training data; and training the third deep neural network estimating the position of the target object, based on the third training data.

5. The learning method of claim 4, wherein the training of the second deep neural network comprises training the second deep neural network, based on the second training data and output data of the trained first deep neural network.

6. The learning method of claim 5, wherein the output data of the trained first deep neural network is an index representing a coarse grid, where it is estimated that the target object is located, of the coarse grids.

7. The learning method of claim 4, wherein the training of the third deep neural network comprises training the third deep neural network, based on the third training data, output data of the trained first deep neural network, and output data of the trained second deep neural network.

8. The learning method of claim 4, wherein the coarse grids denote that the region is divided into A number of coarse grids, the fine grids denote that each of the coarse grids is divided into B number of fine grids, the finer grids denote that each of the fine grids is divided into C number of finer grids, and A, B, and C are the same number or different numbers.

9. The learning method of claim 4, wherein each of the first to third training data is constructed in a data structure having a matrix form, which is configured with rows including grid indexes and columns including cycle time indexes.

10. A computing apparatus comprising:

at least one processor and memory;

a receiver for receiving, from a plurality of real sensors deployed in a real environment, real sensor measurement values representing distances between the sensors and a target object;

a data preprocessing device, comprising the at least one processor and memory, for dividing a region, where a target object is located, into coarse grids, fine grids, and finer grids and generating first preprocessing data including a similarity value between a virtual sensor measurement value and real sensor measurement values measured in each of the coarse grids, second preprocessing data including a similarity value between a virtual sensor measurement value and real sensor measurement values measured in each of the fine grids, and third preprocessing data including a similarity value between a virtual sensor measurement value and real sensor measurement values measured in each of the finer grids;

a matrix data structure for structuring the similarity values using grid and cycle time indexes;

an inference device comprising a first deep neural network for extimating position information about a coarse grid, where the target object is located, by using the first preprocessing data as input data, a second deep neural network for estimating position information about a fine grid, where the target object is located, by using the second preprocessing data as input data, and a third deep neural network configured to estimate a position of the target object by using the third preprocessing data as input data, wherein each of the deep neural networks is trained using the matrix data structures.

11. The computing apparatus of claim 10, wherein the second deep neural network estimates a position of the fine grid where the target object is located, by using the position information about the coarse grid estimated by the first deep neural network and the second preprocessing data as the input data.

12. The computing apparatus of claim 10, wherein the third deep neural network estimates a position of the target object by using the position information about the coarse grid estimated by the first deep neural network, the position information about the fine grid estimated by the second deep neural network, and the third preprocessing data as the input data.

* * * * *